United States Patent
McConnell et al.

(10) Patent No.: US 6,951,592 B2
(45) Date of Patent: Oct. 4, 2005

(54) METHOD OF FORMING A FABRIC COVERED PAD FOR WALL PANEL

(75) Inventors: Anthony McConnell, Holland, MI (US); Randolph Woellper, Hudsonville, MI (US)

(73) Assignee: Haworth, Inc., Holland, MI (US)

( * ) Notice: Subject to any disclaimer, the term of this patent is extended or adjusted under 35 U.S.C. 154(b) by 94 days.

(21) Appl. No.: 10/267,392

(22) Filed: Oct. 9, 2002

(65) Prior Publication Data

US 2004/0071933 A1 Apr. 15, 2004

(51) Int. Cl.$^7$ ................................................ E04C 2/30
(52) U.S. Cl. ...................... 156/211; 52/796.1; 156/213; 156/222; 428/119; 428/121; 428/126
(58) Field of Search ................................ 156/211, 222, 156/213; 217/2; 52/796.1; 428/119, 121, 124, 126, 150

(56) References Cited

U.S. PATENT DOCUMENTS

| | | | |
|---|---|---|---|
| 1,836,354 A | | 12/1931 | Abrams |
| 2,149,882 A | * | 3/1939 | Clements .................... 228/142 |
| 2,485,648 A | * | 10/1949 | Norquist .................... 29/469.5 |
| 3,075,862 A | * | 1/1963 | Hoyer ........................ 428/130 |
| 3,517,427 A | * | 6/1970 | Bainter et al. ............. 29/897.2 |
| 3,885,008 A | | 5/1975 | Martin |
| 4,000,594 A | | 1/1977 | Kirk, Jr. |
| 4,729,917 A | | 3/1988 | Symdra et al. |
| 5,111,579 A | | 5/1992 | Andersen |
| 5,129,202 A | | 7/1992 | Payne et al. |
| 5,172,530 A | | 12/1992 | Fishel et al. |
| 5,174,086 A | | 12/1992 | Payne et al. |
| 5,423,151 A | | 6/1995 | Caro et al. |
| 5,809,715 A | | 9/1998 | Tanaka |
| 6,214,148 B1 | | 4/2001 | Hill |
| 6,223,485 B1 | | 5/2001 | Beck et al. |
| 6,226,849 B1 | | 5/2001 | Beck et al. |
| 6,256,941 B1 | | 7/2001 | Yu et al. |

OTHER PUBLICATIONS

Auto 'V' grooving Inc., Home Page, www.vgrooving.com, 3 pages Oct. 30, 2001.

(Continued)

*Primary Examiner*—Blaine Copenheaver
*Assistant Examiner*—Barbara J. Musser
(74) *Attorney, Agent, or Firm*—Flynn, Thiel, Boutell & Tanis, P.C.

(57) ABSTRACT

Cover pads for use on upright walls, wherein the pad provides an improved internal support which is of simplified construction, for example the center support and the surrounding frame being made of a one-piece monolithic support structure which permits a flexible covering or fabric to be attached to the center support and the exterior side surfaces of the edge frame while the fabric and support structure are in a flat and planar condition, following which the edge frame is folded and secured into position around the center support. The internal support structure for the pad, when in a flat condition, has voids at the corners so that the fabric can be easily tucked into the corners prior to the edge frame being folded into its closing or frame-defining position.

18 Claims, 11 Drawing Sheets

OTHER PUBLICATIONS

Auto 'V' grooving Inc., 'V' Groovers, www.vgrooving.com/products.htm, 3 pages, Oct. 30, 2001.

Auto 'V' grooving Inc., Solid Surface, www.vgrooving.com/prod01.htm, 3 pages, Oct. 30, 2001.

Auto 'V' grooving Inc., LG–1–SS, www.vgrooving.com/lg–1–ss.htm, 3 pages, Oct. 30, 2001.

Auto 'V' grooving Inc., LG–2–SS, www.vgrooving.com/lg–2–ss.htm, 3 pages, Oct. 30, 2001.

Auto 'V' grooving Inc., AVG–48–UMFT, www.vgrooving.com/avg–48–m.htm, 3 pages, Oct. 30, 2001.

Auto 'V' grooving Inc., Wood/Panel, www.vgrooving.com/prod02.htm, 5 pages, Oct. 30, 2001.

Auto 'V' grooving Inc., High Volume www.vgrooving.com/prod03.htm, 2 pages, Oct. 30, 2001.

Auto 'V' grooving Inc., Fold/Glue, www.vgrooving.com/Fold/glue.htm, 3 pages, Oct. 30, 2001.

Auto 'V' grooving Inc., Lineal 'V', www.vgrooving.com/lineal.htm, 3 pages, Oct. 30, 2001.

Auto 'V' grooving Inc., Cross 'V', www.vgrooving.com/cross.htm, 4 pages, Oct. 30, 2001.

Auto 'V' grooving Inc., Automatic Line, www.vgrooving.com/automati.htm, 4 pages, Oct. 30, 2001.

* cited by examiner

METHOD OF FORMING A FABRIC COVERED PAD FOR WALL PANEL

FIELD OF THE INVENTION

This invention relates to a cover pad for attachment to a wall such as for attachment to the frame of an upright space divider wall panel and, more specifically, to an improved pad structure and a process of manufacturing same.

BACKGROUND OF THE INVENTION

Interior space dividing wall systems as used in offices and the like typically incorporate a plurality of interconnected portable wall panels which often permit accessories such as worksurfaces, storage units and other devices or structures to be mounted thereon. The wall panels generally include an interior upright frame which mounts, frequently releasably, cover pads or tiles on one or both sides thereof. The cover pads are typically provided with an outer cloth or fabric covering to provide the wall panel with a desirable appearance. Such cover pads require an internal supporting and rigidifying structure which may be defined by a rigid sheet of material such as metal, particle board, mineral board or the like, and/or an internal frame similar to an open picture frame. The internal structure of the pad then has the external face thereof covered with a thin sheet of flexible fabric or similar covering material. The flexible covering is also typically wrapped around the edges and corners of the internal structure. The covering is then secured by clips or adhesive to the internal structure.

Cover pads having constructions similar to those described above are well known, but as is well recognized in this industry, such pads possess structural and manufacturing complexities which cause the construction of such pads to be undesirably inefficient and costly, and which also result in the pads having a less than desirable appearance, particularly at the corners.

More specifically, the attachment of the flexible covering, i.e. the fabric, requires significant manual manipulation to effect aligning and stretching of the fabric across the exposed face of the internal structure. And, the wrapping and securing of the fabric around the edges is further complicated by the necessity of folding and inwardly tucking the excess fabric which exists at the corners, which operation generally requires significant manual handing of the fabric and often results in fabric wrapped corners of inconsistent quality and hence less than desired appearance. In addition, the internal structure of the pad and the typical requirement for an internal frame cause the pad to have an undesired number of parts which increases manufacturing complexity and cost.

Accordingly, the present invention relates to improvements associated with cover pads for use on upright walls, which improvements simplify the construction and manufacturing of the pad so as to overcome or at least minimize some of the disadvantages associated with presently known pads.

More specifically, the pad of this invention provides an improved internal support which is of simplified construction, for example the center support and the surrounding frame being made of a one-piece monolithic support structure, which permits the flexible covering or fabric to be attached to the center support and the exterior side surfaces of the edge frame while the fabric and support structure are in a flat and planar condition, following which the edge frame is folded and secured into position around the center support. The internal support structure for the pad, when in a flat condition, has voids at the corners so that the fabric can be easily tucked into the corners prior to the edge frame being folded into its closing or frame-defining position.

Other advantages, objects and/or purposes of the invention will be apparent to persons familiar with constructions of this general type upon reading the following specification and inspecting the accompanying drawings.

Figure 1:
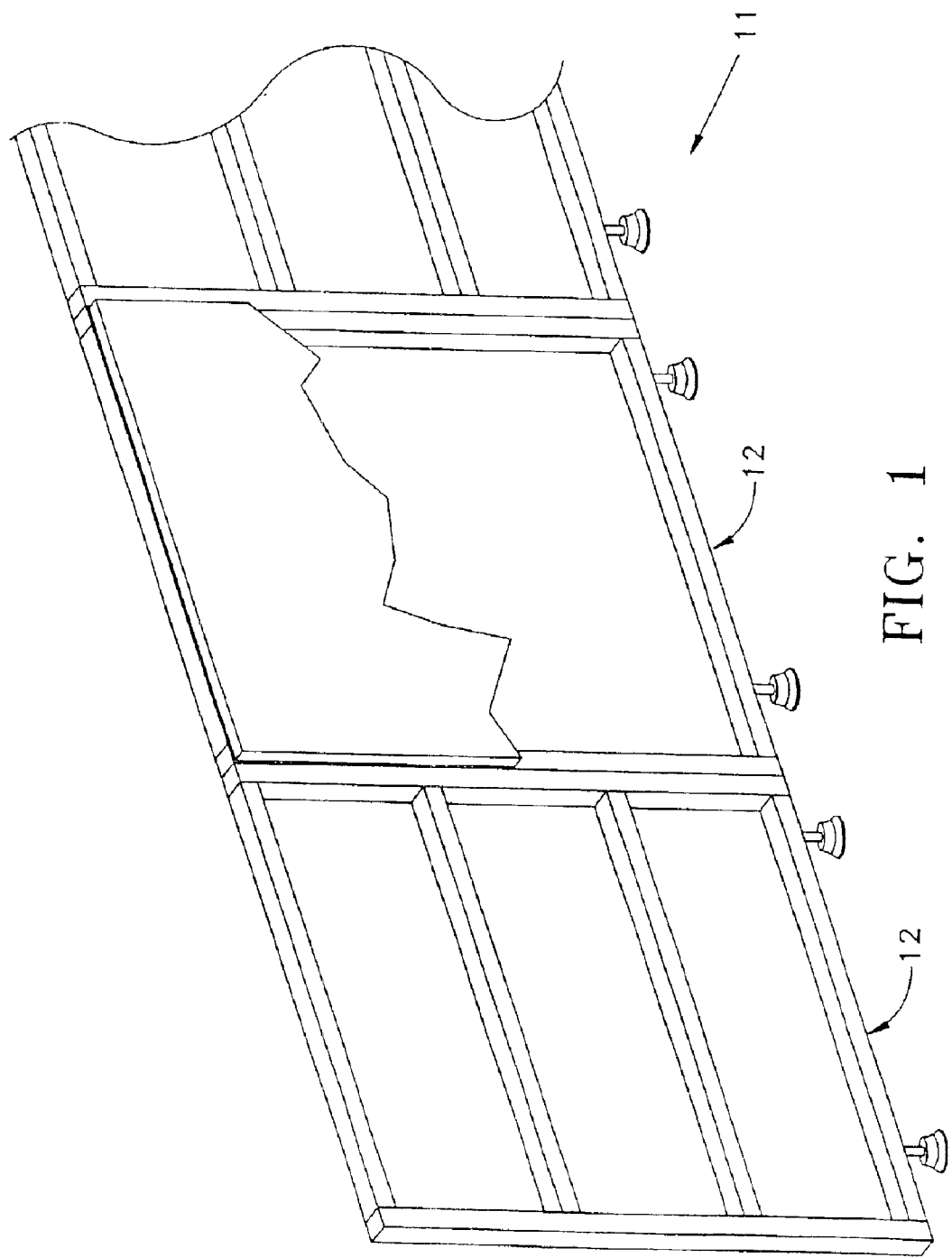
FIG. 1 is a perspective view of a known wall panel system having one or more cover pads associated with one and typically both sides thereof.

Certain terminology will be used in the following descriptions for convenience in reference only, and will not be limiting. For example, the words "inwardly", "outwardly", "rightwardly" and "leftwardly" will refer to directions in the drawings to which reference is made. Said terminology will include the words specifically mentioned, derivatives thereof, and words of similar import.

DETAILED DESCRIPTION

Figure 2:
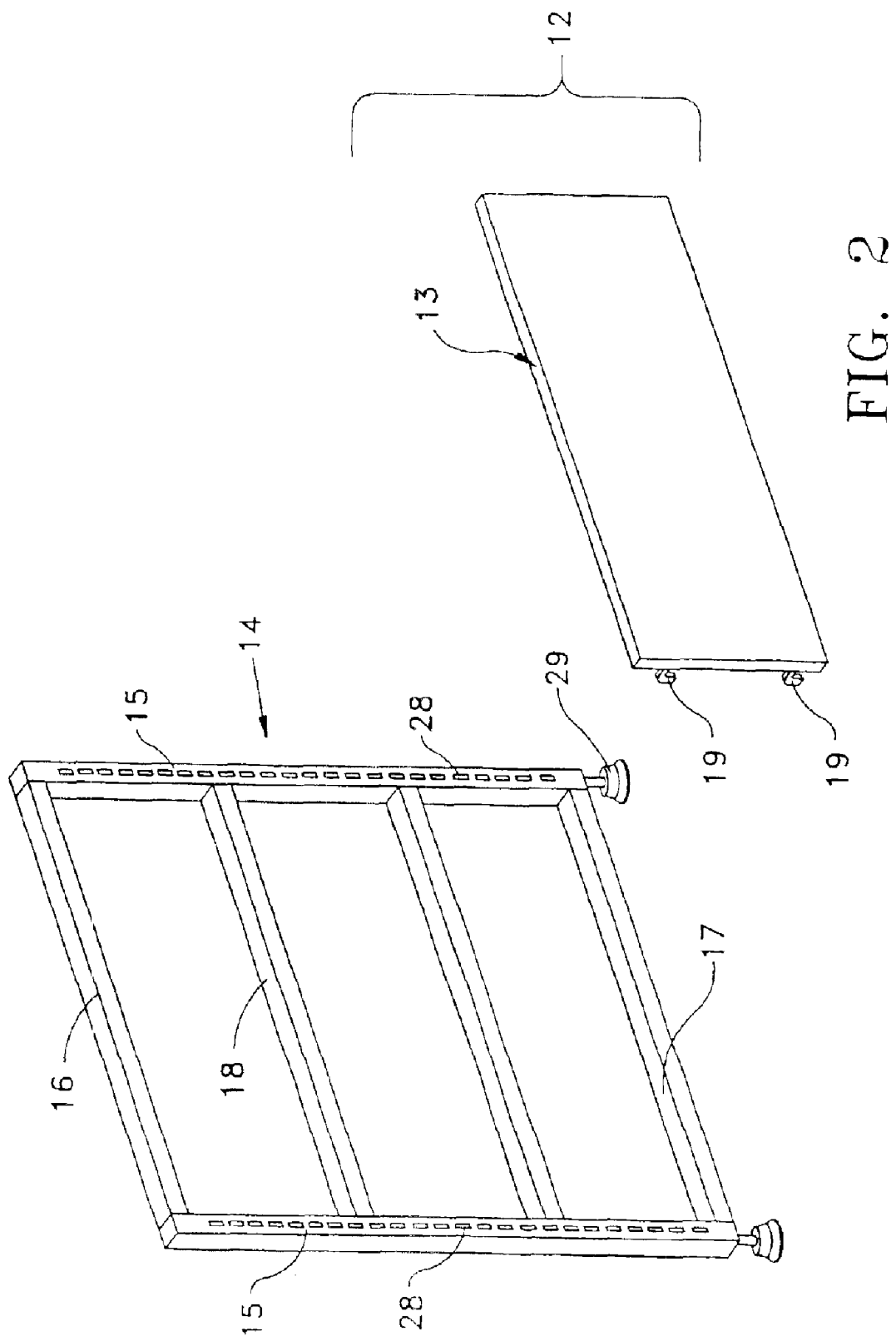
FIG. 2 is a perspective view which illustrates the internal frame of a known wall panel, and further illustrates a typical cover pad shown in a separated position relative to the frame.
Figure 3:
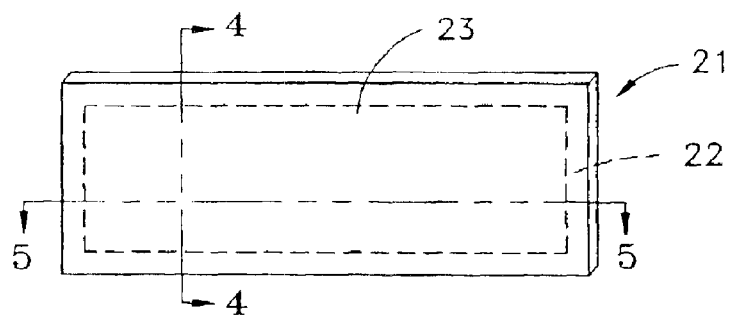
FIG. 3 is a front perspective view of a cover pad according to the present invention.

Referring to FIGS. 1 and 2, there is illustrated part of an upright interior wall system 11 defined by a plurality of upright panels 12 which connect together horizontally in aligned and/or nonaligned relationship to define an upright wall for dividing interior spaces. Such wall systems 11 are conventionally utilized in offices and the like for dividing large interior spaces into smaller workspaces, and the wall system typically utilizes wall panels 12 which are either factory or on-site assembled, and are supported on a conventional floor and project upwardly to a desired height which, in most use situations, is less than ceiling height.

In the illustrated arrangement, the wall panel 12 as depicted in FIG. 2 includes one or more cover pads or tiles 13 which mount on one or both sides of an interior rigid frame 14. The frame 14 conventionally includes a pair of parallel and sidewardly spaced elongate uprights or edge rails 15 which have the upper ends rigidly joined by a generally horizontally-extending top cross rail or beam 16, with a further horizontally-extending bottom cross rail or beam 17 being joined between the uprights 15 adjacent the lower ends thereof. The uprights 15 and beams 16–17 hence define a rigid upright frame of rectangular configuration which is open in the interior thereof and which, in many applications, is provided with one or more intermediate horizontally-extending cross rails or beams 18 disposed in vertically spaced but parallel relationship between the beams 16 and 17 and extending between and rigidly joined to the uprights 15. The cover tiles 13 are conventionally provided with some type of securing clip, such as the hooks 19 illustrated in FIG. 2, which are releasably engageable with the frame for permitting the cover tiles to be attached to the exterior side surfaces of the frame. In one conventional technique, the uprights 15 are provided with a plurality of slots 28 positioned within a row extending vertically, i.e. longitudinally, along the upright for permitting the hooks 19 to be engaged therein.

The frame also typically mounts adjustable feet or glides 29, which can be mounted to the lower ends of the uprights 15 if desired, for supportive engagement with the floor.

The overall panel system, and more specifically the wall panel construction described above, is conventional and illustrates one of many conventional systems with respect to the manner of constructing the panel frame and the attachment of the cover pads thereto.

Referring now to FIGS. 3–10, there is illustrated an improved construction of a cover pad 21 according to the present invention. The cover pad 21 is intended for releasable securement to the sides of an upright wall panel frame, such as a frame similar to that illustrated by FIGS. 1 and 2.

The cover pad 21 in its assembled condition includes a generally ring-shaped edge frame 22 which is rigidly secured to and projects rearwardly from a main center pad part 23 which extends coextensively of the exterior side of the cover pad. The frame 22 and center pad part 23 define the internal support structure for the cover pad, which internal support structure is exteriorly covered by an outer covering 25 defined by a thin and flexible sheet of covering material typically a fabric (i.e. cloth) material.

Figure 4:
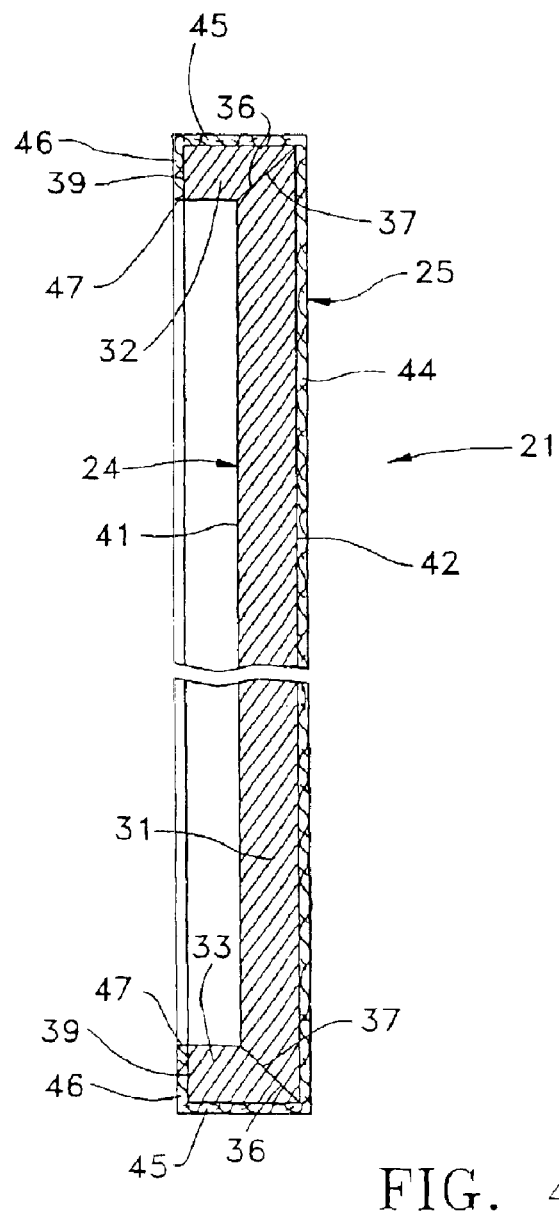
FIGS. 4 and 5 are enlarged fragmentary views taken along lines 4—4 and 5—5, respectively, in FIG. 3.
Figure 5:
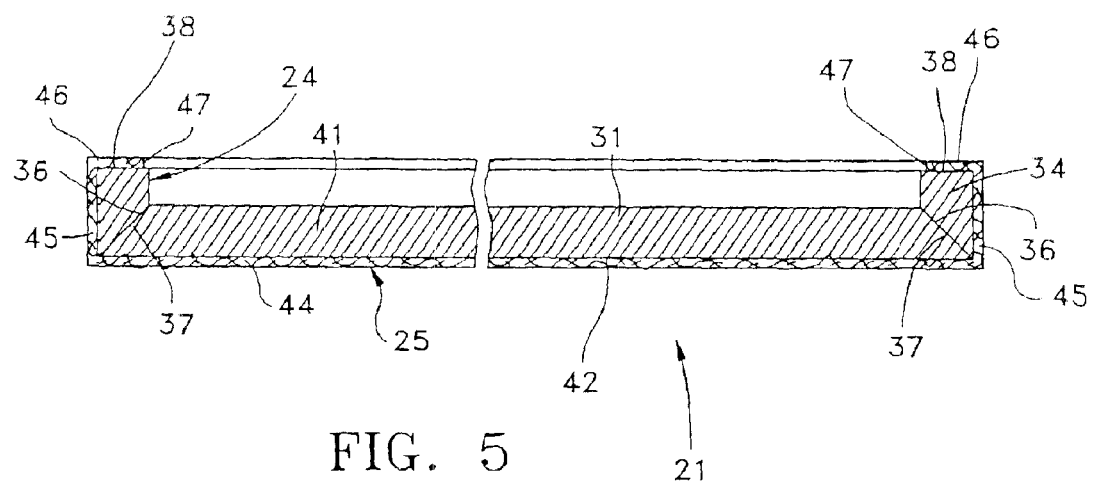
Figure 6:
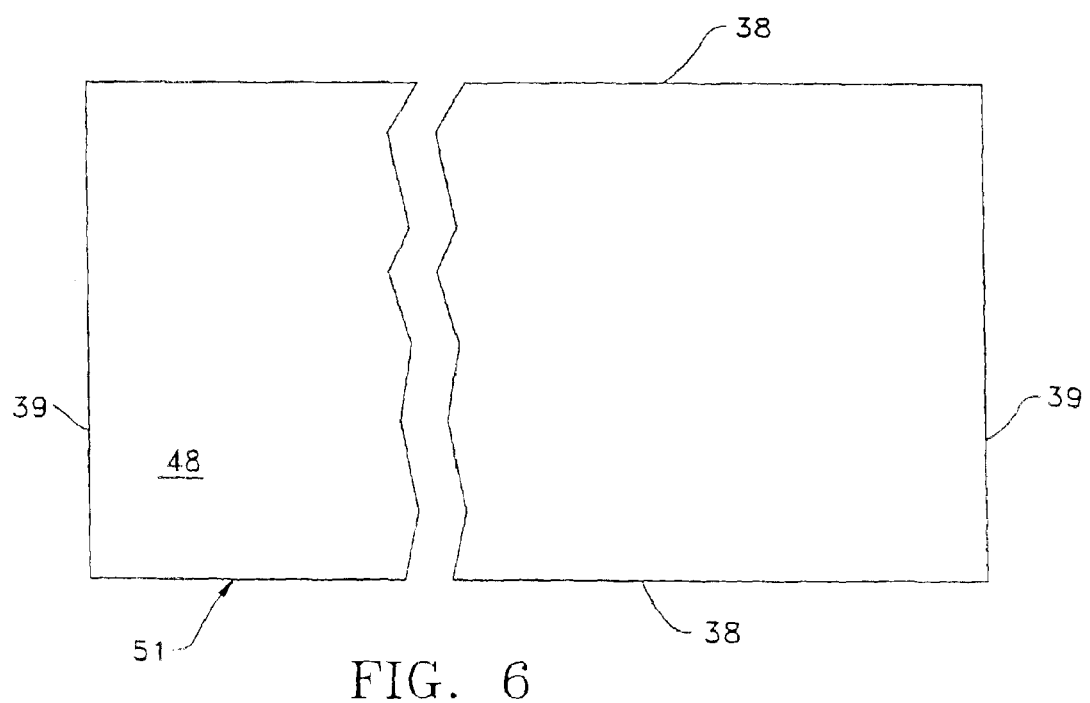
FIG. 6 illustrates the front non-grooved surface of a blank which defines the internal support structure of the pad, prior to folding of the blank.

The rigid rectangular frame 22, as illustrated by FIGS. 4 and 5, is defined by generally parallel top and bottom edge members 32 and 33 respectively, which extend lengthwise throughout the length of the pad 21 and, at opposite ends, cooperate with the respectively adjacent ends of parallel side edge members 34 and 35 which extend vertically throughout the height of the pad member 21 in typically perpendicular relationship to the top and bottom edge members 32–33. Each of the edge members 32–35, adjacent the front end thereof, defines thereon a tapered or beveled surface 36 which extends across the width of the edge member and which effectively abuts a respective corresponding opposed bevel surface 37 associated with the respective edge of the main center pad part 23. These opposed bevel surfaces 36 and 37 are compatible so as to effectively define a 90° angle between the edge members 32–36 and the main center panel part 23, with the angle on the individual beveled surfaces 36 and 37 typically each being 45° relative to the substantially flat and planar front surface of the center pad part 23. The opposed beveled surfaces 36 and 37 are typically fixedly secured together, such as by a suitable adhesive or glue or bonding agent being provided between the opposed engaging beveled surfaces.

The upper and lower edge members 32–33 of the ringlike edge frame define thereon rear surfaces 38 which are substantially coplanar with rear surfaces 39 defined on the side edge members 34–35. The plane defined by the rear surfaces 38–39 of the edge frame is generally parallel with but spaced rearwardly from the plane defined by the rear surface 41 of the main support pad 23.

The main support pad 23 defines thereon a generally planar front or exterior surface 42 which, at the peripheral edges thereof, defines right angle corners with respect to the side or exterior surfaces 43 defined by the edge members 32–35. These side exterior surfaces 43 hence project rearwardly from the front surface 42 in generally perpendicular relationship thereto.

The thin flexible outer covering material 25, for example a thin sheet of flexible fabric, includes a main or center fabric part 44 which extends coextensively over the front surface 42 of the center support pad 23, with the fabric being wrapped around the outer corners of the center support pad so as to include side fabric portions 45 which cover the side exterior surfaces 43 of the ringlike edge frame. The flexible fabric sheet 25 is additionally preferably wrapped around the outer rear corner of the edge frame so as to have rear fabric portions 46 which typically at least partially cover the rear surfaces 38–39 of the edge frame, with the fabric sheet terminating in a free edge 47. The fabric sheet is preferably fixedly secured to at least the edge frame, such as by being adhesively bonded or secured to at least the edge members 32–35 so as to maintain the center fabric part 44 stretched flatly (for example tautly) across the front surface 42.

The pad 21 of this invention possessing the above described constructional features is preferably manufactured utilizing a process similar or corresponding to the process as described below.

There is initially provided a generally rigid support pad or blank 51 which has generally parallel and flat front and rear surfaces 48 and 49, respectively, with the blank 51 typically being of a generally rectangular configuration defined by the edge walls 38 and 39. The blank can be constructed of wood or other suitable materials, as explained hereinafter, so as to have a generally rigid construction, with the blank of desired dimensions being suitably initially formed, such as by being cut from larger sheets if necessary or desired.

Figure 7:
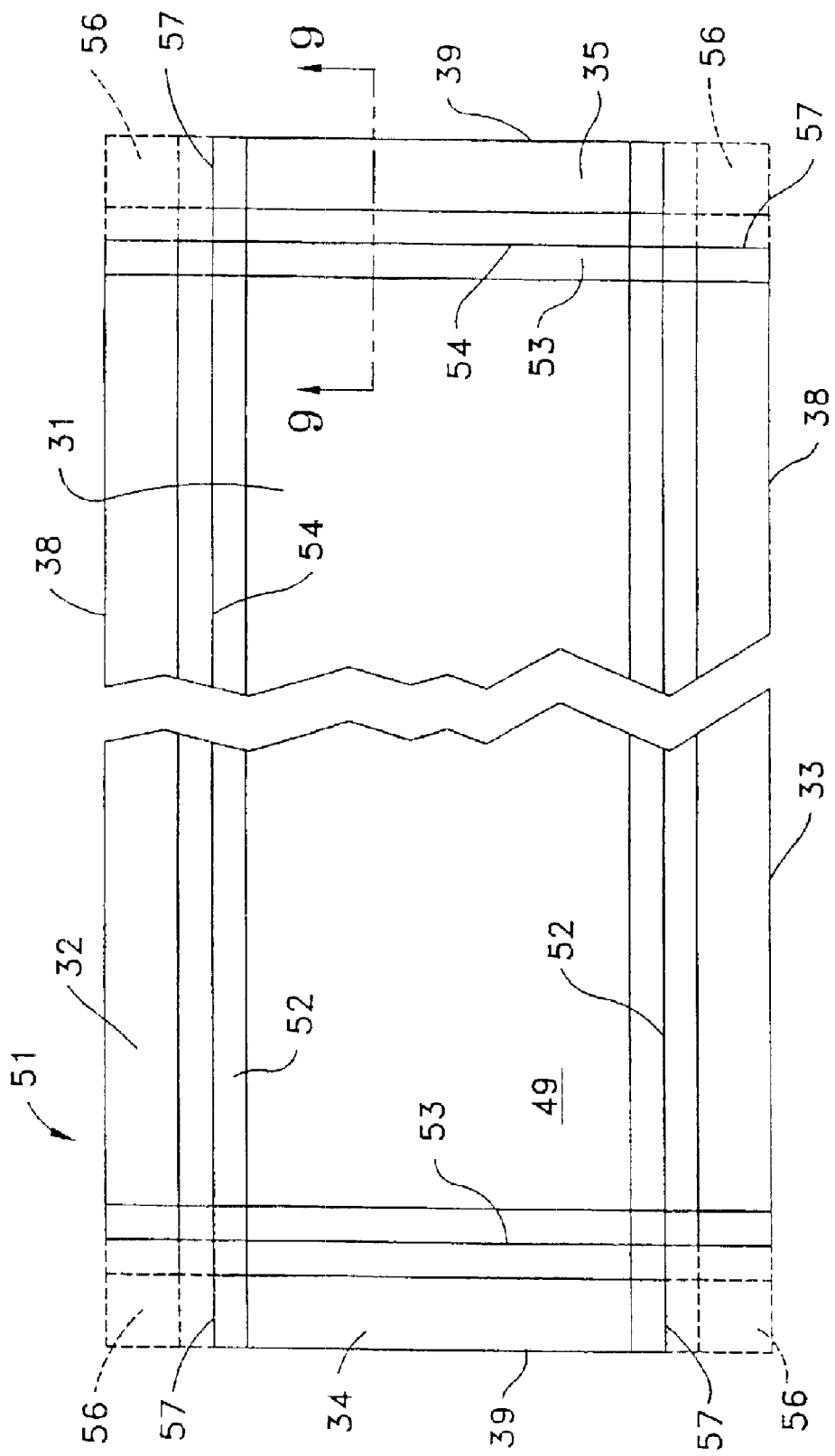
FIG. 7 illustrates the rear surface of the blank shown in FIG. 6 after the blank has been grooved.
Figure 8:
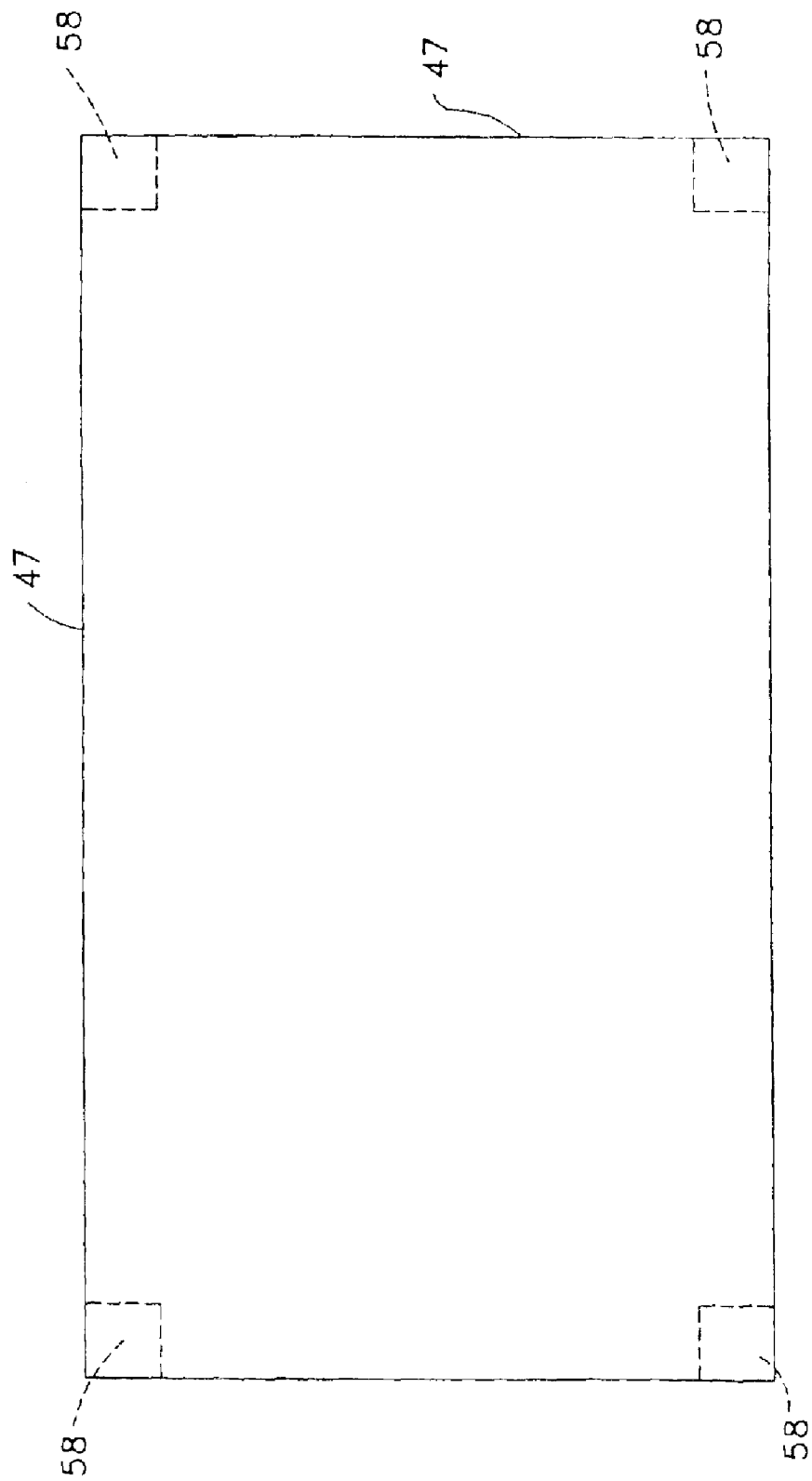
FIG. 8 illustrates a sheet of flexible covering material, for example fabric, which is to be superimposed over and adhesively secured to the blank shown in FIG. 6.
Figure 9:
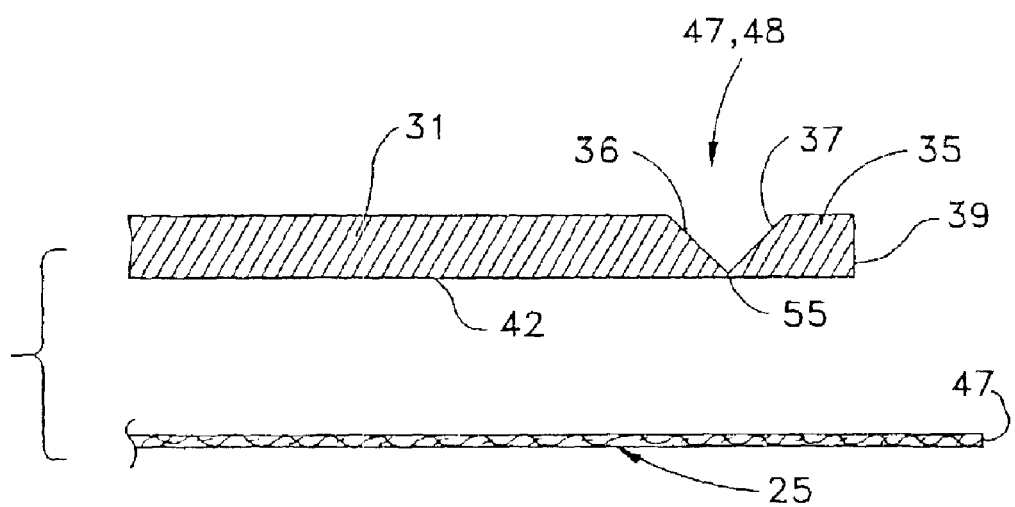
FIG. 9 is an enlarged fragmentary sectional view taken generally along lines 9—9 in FIGS. 7 and 8 and showing the blank and fabric in separated but superimposed relationship.

The support blank 51 is subjected to subsequent forming steps which include forming, for example cutting, a pair of generally parallel channel-like grooves 52 into the blank from the rear surface 49 thereof. The grooves 52 are respectively disposed adjacent but spaced inwardly in parallel relationship from the adjacent side edges 38, and the grooves 52 extend longitudinally throughout the length of the blank. A further pair of generally parallel channel-like grooves 53 are formed, for example cut, into the blank from the rear surface 49 thereof, which grooves 53 are disposed adjacent but spaced inwardly from the respective end edges 39. The grooves 53 extend transversely across the width of the blank and hence intersect the grooves 52. The grooves 52 and 53 preferably have identical cross sections and, in the illustrated arrangement, preferably comprise V-shaped grooves which extend through substantially the entire thickness of the blank 51 except that the depth of the grooves 52 and 53 is preferably slightly less than the blank thickness so that the bottom of each groove, as defined by the apex 54 thereof, which apex also defines the lengthwise-extending centerline of the groove, is spaced a small distance from the front surface 48 of the blank 51 so as to leave a thin bridge or section 55 of blank material. The blank 51, after forming of the grooves 52 and 53 therein, remains as an integral and monolithic one-piece flat pad or plate which defines the main center support pad 23 as well as the side edge members 32–35, all formed and integrally joined in a generally flat condition as illustrated in FIG. 7. In this latter condition, the grooves 52 and 53 where they intersect result in formation of small generally rectangular corner parts 56 which, due to the presence of the bridge sections 55, remain integrally and rigidly joined to the blank. These corner parts 56 are ultimately removed and discarded, however, so as to leave generally rectangular recesses 57 associated with the corners of the blank. The corner parts 56 can be removed either before or after attachment of the fabric to the blank, as discussed below.

The grooved one-piece flat blank is attached, preferably by adhesive or glue, to the sheet of flexible covering material 25 which is also typically precut so as to have a rectangular configuration which corresponds to but is preferably slightly larger than the rectangular configuration of the blank 51. The exterior or front surface 48 of the blank 51, and specifically those portions of the surface 48 corresponding to the edge or frame strips 32–35, are provided with adhesive or glue thereon, and then the grooved blank 51 and fabric sheet 25 are appropriately superimposed, with the sheet 25 being maintained in a flat and non-wrinkled condition so that the fabric sheet along a band which extends around the outer portion thereof becomes adhesively fixed to the outer surfaces of the edge strips 32–35. This adhesive securement of the fabric to the grooved blank occurs while both the fabric and the blank are in a generally flat and hence planar condition. In addition, the edge surfaces 38 and 39 are also preferably provided with adhesive or glue thereon, and the edge portions of the fabric sheet are wrapped upwardly to overlap and be adhesively secured to the edge surfaces 38 and 39. This latter step can be carried out automatically by suitable processing equipment, such as use of flexible membrane presses or the like, or can be carried out manually if desired.

As to the corner pieces 56, they can be removed prior to attachment of the fabric 25 to the blank 51 merely by breaking the corner pieces away from the blank due to flexing of the corner pieces, causing fracturing along the thin bridge sections 55. Alternately, the corner pieces 56 can remain attached to the blank 51 during the initial securement of the fabric to the exterior surfaces of the edge frame strips 32–35, with the corner pieces 56 being fractured and removed prior to the edge portions of the fabric edges being wrapped upwardly and secured to the edge surfaces 38 and 39.

Figure 10:
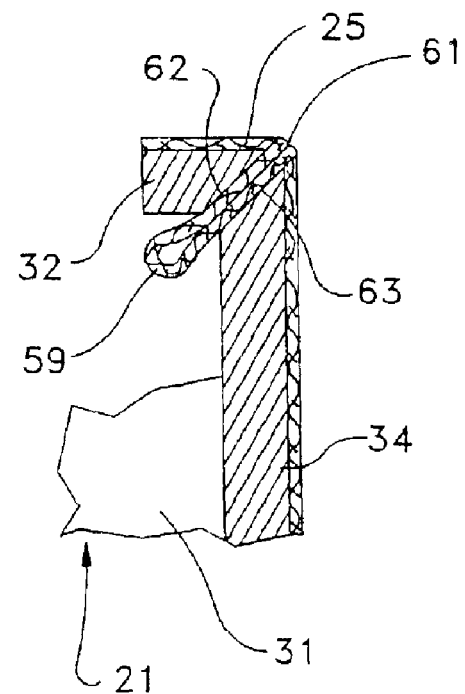
FIG. 10 is a fragmentary rear elevational view showing one corner of the cover pad after assembly thereof and specifically illustrating the excess corner fabric tucked and clampingly held between opposed ends of the folded edge flanges defining the rigid frame.

Once the flat fabric sheet 25 has been secured to the outer surfaces of the edge strips 32–35 and the corner pieces 56 have been removed, and in addition a strip of adhesive or glue is or has already been inserted into each of the grooves 52 and 53 throughout substantially the length thereof, then the opposed edge strips 32–33 and 34–35 are folded upwardly relative to the center pad part 23 so as to define a complete ring-shaped frame which is integrally joined to and extends around the periphery of the main pad part 23. More specifically, the corner portions 58 of the fabric sheet are lifted upwardly, either manually or mechanically, prior to all of the edge strips 32–35 being folded upwardly to define the continuous ring-shaped rectangular frame, whereby the corner fabric portions 58 are effectively clamped between the opposed ends of the edge strips 32–35 at each corner of the frame and hence create a tuck or fold of material 59 which is retained inside the frame rearwardly of the main pad part 23, substantially as illustrated in FIG. 10.

Explained in somewhat greater detail, merely as exemplary of one process for accomplishing the above, the opposed horizontal edge flanges 32 and 33 can be initially folded upwardly into transverse relationship with respect to the center pad part 23, which upward folding will, depending upon the material selected for the blank 51, cause the bridge sections 55 to either fracture or function as a living hinge, with the fabric 25 also functioning as a living hinge, whereby the opposed horizontal edge flanges 32–33 can be folded upwardly so that the opposed beveled surfaces 36 and 37 defining the grooves 52 hence effectively abut and become adhesively secured together. Thereafter the fabric corner portions 58 are either manually or mechanically folded upwardly and inwardly accompanied by upward folding of the opposed vertical edge strips 34–35, which latter folding of the edge strips 34–35 again causes the bridge sections 55 to either fracture or function as a living hinge, with the fabric also functioning as a living hinge for joining the bridge sections 34–35 to the main center part 23. The upward folding of the edge sections 34–35 again causes the opposed groove surfaces 36–37 to come substantially into contact with one another and to be adhesively secured together. At the same time, the upward closure of the edge strips 34–35 causes the fabric corner portions 58 to be clamped and hence trapped between the opposed beveled end surfaces 62–63 as defined at the opposed ends of each respectively adjacent pair of edge strips so that the excess corner fabric 58 is hence trapped and held internally behind the pad so that the finished exterior corner of the pad is entirely covered by fabric and has a neat appearance which is relatively free of wrinkles or bunching.

During the forming of the fabric-covered pad 21 as described above, it will be appreciated that the folding of the edge strips 32–35 may be in a sequential manner, or the edge strips may all be folded simultaneously, either being possible and acceptable, depending upon the selected forming process and specifically the types of fixtures and equipment utilized and the degree of selected automation associated therewith. To facilitate this process, it is contemplated that same can be carried out substantially entirely automatically utilizing appropriate fixturing and handling equipment, or the process may be carried out at least in part with manual assistance and manipulation provided in conjunction with appropriate fixtures.

With the present invention, the main interior support 24 which defines both the main center pad part 23 and the surrounding ring-shaped edge frame 22 can hence all be formed by a single support pad or blank 51 which, due to provision of appropriate grooves such as grooves 52 and 53 formed inwardly from the rear side thereof, enables the fabric 25 to be secured to the opposite side of the blank, typically at least in the edge regions of the blank which define the edge members 32–35 prior to their being hinged into the transverse frame-defining position, whereby the blank and fabric hence can be adhesively secured together while each is maintained in a generally flat and one-piece condition to thus facilitate the securement of the fabric to the blank. This additionally enables the fabric to function as a living hinge, whereby the edge strips 32–35 can thereafter be pivotally folded through angles of about 90° into transverse orientations with respect to the main center pad part 23 to hence permit forming of the rigid ringlike frame 22 in surrounding relationship to the center pad part 23, with this latter forming step additionally permitting the fabric corner portions 58 to be readily tucked into and clamped between the tapered end faces 62–63 formed on the edge strips 32–35 to thus permit simple forming of a clean fabric wrapped corner on the finished cover pad 21 while at the same time enabling the fabric to be adhesively secured to the outer surfaces of the edge strips 32–35 prior to the pivoting or folding thereof into the frame configuration. The frame configuration and its rearward protrusion with respect to the center pad 23 hence provides additional strength and reinforcement to the overall cover pad 21 while at the same time providing a finished cover pad having an appearance defined by clean and well-defined fabric-wrapped edges and corners.

The material defining the rigid blank 51 may be wood, for example particle board. Other alternative materials for the blank 51 include mineral board (for example Celotex) or low-density wood fiberboard such as Korlite. With the blank 51 made of these materials, the bridge sections 55 will typically fracture during folding of the edge members 32–35 into the frame-forming position so that the living hinge is hence defined principally by the fabric which attaches the edge members to the center pad 31.

As an alternate material for defining the blank 51, same could be constructed of what is known as R board, the latter being a polyurethane foam sheet having relatively thin fiberglass layers defined on opposite surfaces of the polyurethane sheet. When using R board for the blank 51, the grooves 52 and 53 will typically penetrate through one fiberglass surface layer and through the entire thickness of the polyurethane sheet, with the opposite fiberglass surface layer being utilized to define the bridge section 55 since the fiberglass surface layer will typically have a thickness of about 0.010 inch. When the blank 51 formed from R board has the edge members 32–35 thereof folded into the frame-defining position, the nongrooved fiberglass skin will typically not fracture but rather will function as a living hinge when the edge members 32–35 are folded into the frame-defining position. With the R board, the one fiberglass surface surface layer (i.e. skin) hence cooperates with the fabric to define a living hinge.

Other materials are believed suitable for defining the blank 51, including bio-fiber or Agri-fiber boards involving fibers such as flax or jute fibers secured with a polymer binder. Such materials when in plate form can additionally be molded with heat so as to permit embossing of the plate, particularly on the exterior surface thereof, so as to provide for variable surface treatments and the like.

The material defining the blank 51 will most typically have a thickness in the range of three-eighths to three-fourths inch, with a typical and preferred thickness being about one-half inch. However, with some of the materials used for defining the blank, such as a metal/plastic/metal sandwich, the thickness of the blank material may be as little as one-eighth inch.

When securing the fabric to the grooved blank 51, the fabric can be secured to the blank by means of adhesive which is applied over the entire exterior surface of the blank 51, or alternatively the adhesive may be applied solely to the exterior surfaces of the edge members 32–35. In addition, while the fabric edges can be wrapped around and adhesively secured to the end surfaces 38 and 39 of the edge strips, it will be appreciated that securement of the fabric edges to the end surfaces 38 and 39 can also be carried out using other securement techniques such as staples or the like since this surface of the finished cover pad 21 faces the panel frame and hence is hidden when the cover pad is mounted on the panel frame.

Rather than applying adhesive to the blank 51 and thereafter securing the fabric thereto, it will be appreciated that the adhesive securement of the fabric to the blank may make use of a meltable adhesive such as a hot melt applied initially to the back side of the fabric, prior to placement of the fabric on the blank 51, with the fabric after placement on the blank 51 then being heated such as within a bag-type membrane press so as to effect melting of the adhesive and securement of the fabric to the blank.

The process for forming the cover pad 21 of this invention, when the substrate is of wood or mineral board, is summarized as follows:

1. cutting the blank 51 from a larger sheet of material;
2. forming transverse and longitudinal grooves in the rear surface of the blank through substantially the full thickness of the blank except for a small bridge thickness, such as a thickness in the neighborhood of about 0.010 inch;
3. positioning the fabric over and adhesively securing the fabric to the exterior non-grooved surface of the blank, at least along the exterior surfaces of the edge members;
4. wrapping the fabric edges around the edges of the blank and securing the fabric to the blank edges, either adhesively or mechanically;
5. removing the corner pieces from the blank (if not already done during the blank forming step) so as to leave corner recesses which have fabric corner portions extending thereover;
6. folding the edge members of the blank inwardly into the frame-defining position and folding the fabric corner portions inwardly between the adjacent ends of the edge members to effect clamping of the fabric corners between the ends of the edge member;
7. inserting mounting clips, if used, between the opposed beveled surfaces defined between the edge members and the center pad part; and
8. securing the edge members in the folded position relative to the center pad part, either adhesively (for example a hot melt) or mechanically (for example staples or nails) to define a closed ringlike frame in surrounding relationship to the center pad part.

When the blank is formed from R-board or of materials having similar properties, then the same process steps can again be utilized, although the corner pieces of the blank will typically be removed from the blank prior to the fabric being adhesively secured to the exterior non-grooved surface of the blank.

Figure 11:
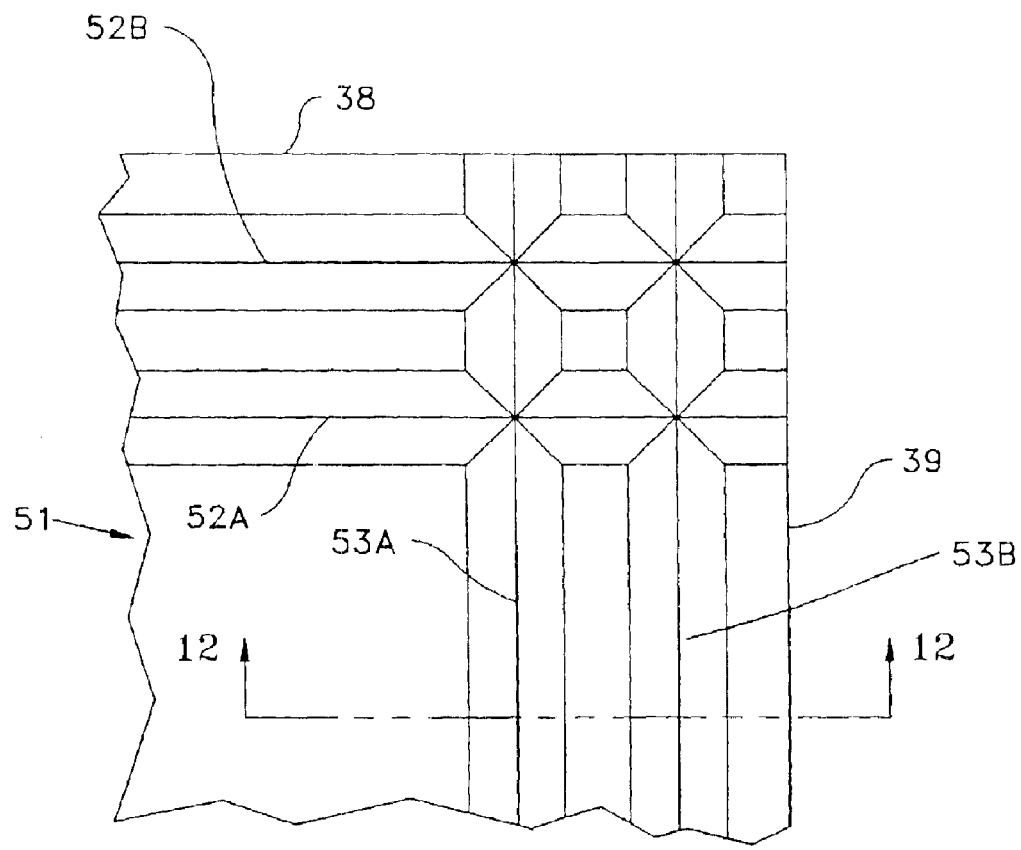
FIG. 11 is an enlarged fragmentary view showing the rear grooved surface of the blank employing a modified grooving arrangement, namely a double groove arrangement.
Figure 12:
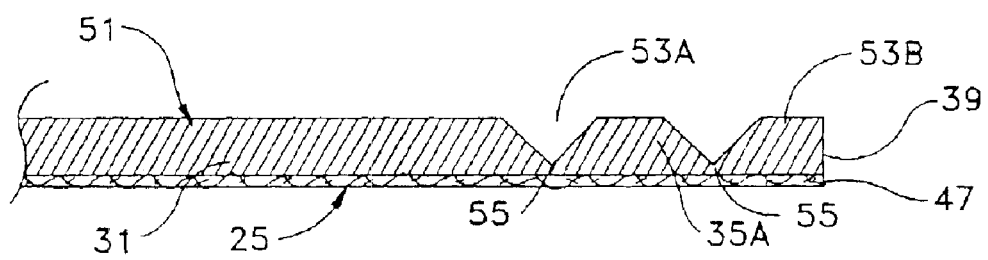
FIG. 12 is an enlarged sectional view taken generally along line 12—12 in FIG. 11 and showing the grooved blank in a flat condition and having the fabric secured to the non-grooved surface thereof.
Figure 13:
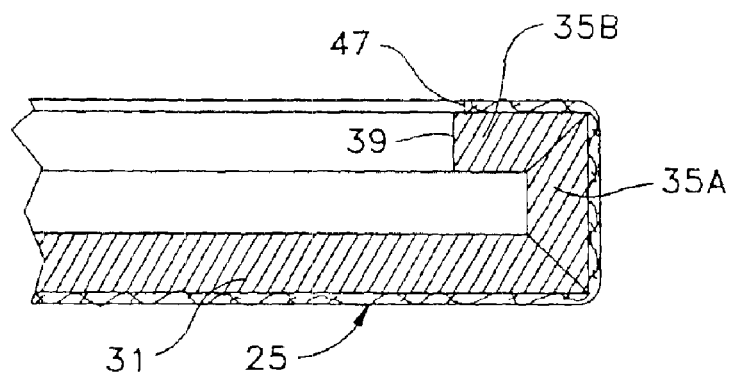
FIG. 13 shows the blank of FIG. 12, with the fabric secured thereto, in the folded secured position so as to define the rigid frame which is joined to and surrounds the main center substrate of the pad.

Referring now to FIGS. 11–13, there is illustrated a variation of the invention wherein each edge flange 32–35 of the blank 51 is defined by two parallel grooves such as by the grooves 52A–52B and 53A–53B, which are laterally spaced a small distance apart. The two grooves hence divide each edge flange into an intermediate flange part such as 35A and an outer flange part 35B. Each of the grooves 53A and 53B is again basically a 90° V-groove which penetrates through substantially the entire thickness of the blank except for the small bridge section 55, and in this variation the fabric 25 has the edge thereof terminating in engagement with the outer flange part 35B since there is no need to wrap the fabric around the edge surface 39. With this double 90° groove arrangement, and the resulting double edge flange construction, the edge flange 35A is folded upwardly to effect severing of the bridge associated with the inner groove 53A so that the intermediate flange part 35A hence projects rearwardly and defines the outer edge of the frame and of the cover pad, and the outer flange part 35B is additionally folded inwardly relative to intermediate flange part 35A to effect severing of the bridge at the bottom of groove 53B so that the flange part 35B as illustrated in FIG. 13 hence projects inwardly so as to be positioned rearwardly with respect to the main center pad part 23. Each of the grooves when in the folded position is provided with means for fixing the flanges in the folded position of FIG. 13, such as by means of an adhesive positioned within each groove. This double-grooved edge flange hence permits creation of a structurally more-robust frame while at the same time permitting the frame to have minimal front-to-back thickness so as to provide a slim cover pad.

Figure 14:
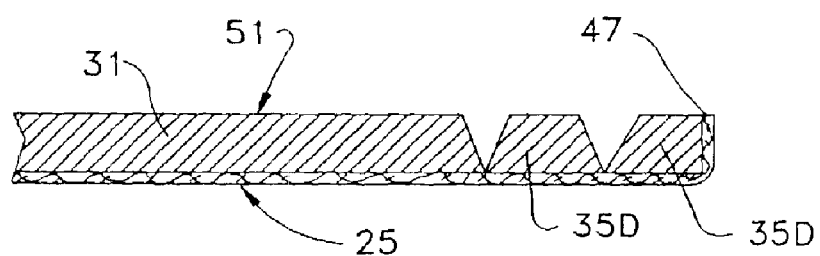
FIGS. 14 and 15 are sectional views which generally respectively correspond to FIGS. 12 and 13 but which illustrate a modified double groove arrangement so that the resulting frame provides an outer beveled corner.
Figure 15:
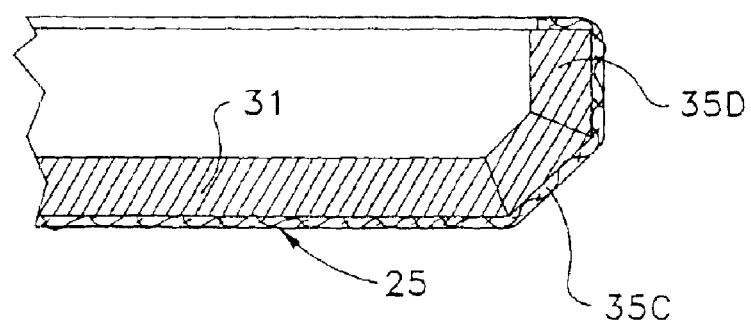

FIGS. 14 and 15 illustrate a further variation wherein the edge flanges associated with the blank are again of a double-groove construction similar to that illustrated by FIGS. 11–13. In this variation, however, the two grooves as designated 53C and 53D are of smaller angular extent, such as each being a 45° included angle V-groove, so that when the intermediate and outer edge flange parts 35C and 35D, respectively, are folded into the frame defining position illustrated by FIG. 15, the outer flange part 35D projects rearwardly and defines the outer periphery of the rigid frame, whereas the intermediate flange part 35C effectively joins at a 45° angle between the main pad part 23 and the outer flange part 35D so that the resulting pad has an exterior beveled corner. This hence permits elimination of the sharp exterior corner, and permits the pad to provide a different appearance.

Figure 16:
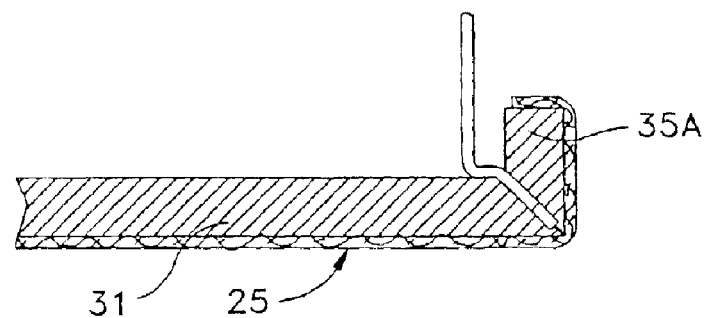
FIG. 16 is an enlarged fragmentary sectional view which illustrates the corner defined between the center substrate part and the folded edge flange defining the frame, and specifically illustrates a variation wherein a mounting clip can have a part thereof clampingly held between the opposed beveled surfaces which are joined to define the corner of the pad internal support structure.
Figure 17:
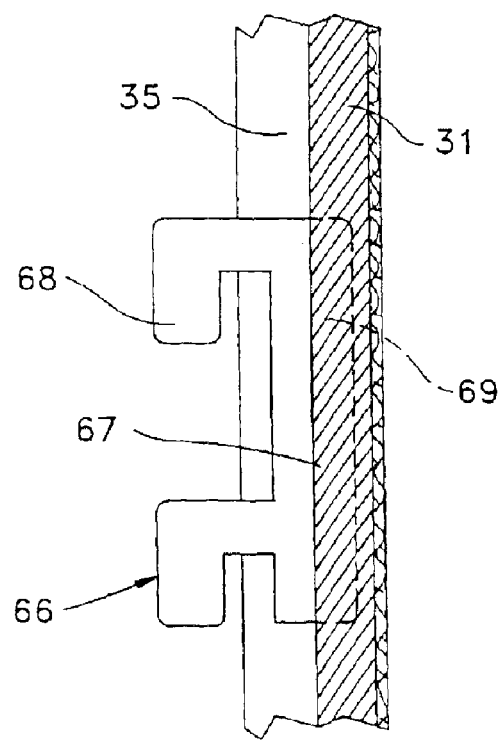
FIG. 17 is a fragmentary elevational view taken generally along line 17–17 in FIG. 16.

The improved cover pad 21 of this invention can also be provided with mounting clips 66 (FIGS. 16 and 17) associated therewith, which clips are secured between the opposed groove sidewalls during the folding of the edge flanges so as to protrude rearwardly from the cover pad for suitable engagement with the frame. One example of a suitable clip 66 is illustrated in FIGS. 16–17 and includes a main flange 67 which projects rearwardly from the rear surface of the center pad part 23 and has suitable hooks 68 or other fastening structure associated therewith for engagement with appropriate slots or structures associated with the panel frame. The clip 66 additionally has a mounting flange 69 which protrudes at an angle relative to the flange 67 and is positionable in the groove so as to be fixedly clamped between the opposed beveled surfaces 36 and 37 when the appropriate edge flange, such as flange 35, is folded and secured in the frame-defining position. One or more such clips 66 can be clamped in vertically spaced relationship along each of the vertical edge flanges 34–35 for engagement with slots associated with the frame uprights 15, or alternatively such clips can be associated with the horizontal edge flanges 32–33 and can be provided with suitable hooks or the like for engagement with the horizontal beams associated with the panel frame.

Figure 18:
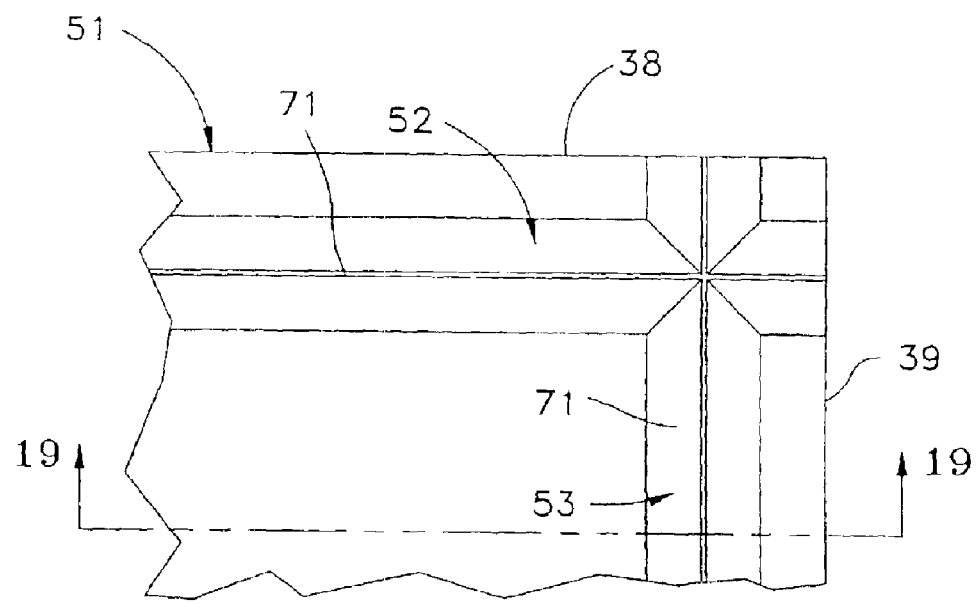
FIG. 18 is an enlarged fragmentary elevational view showing one corner of the grooved side of the blank but illustrating a modified configuration of the V grooves formed therein.
Figure 19:
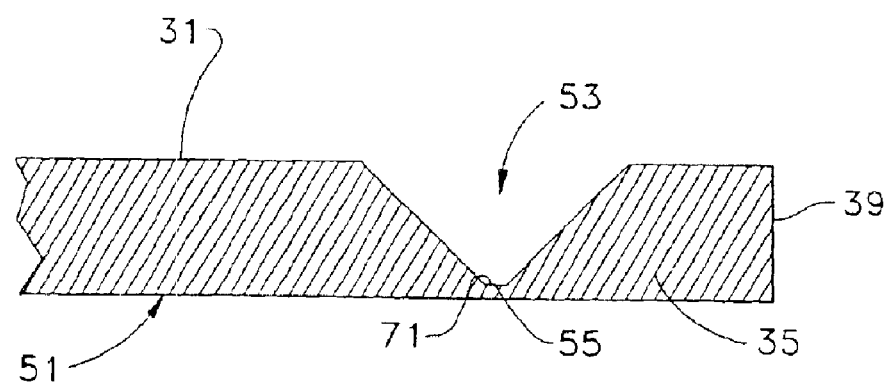
FIG. 19 is a cross-sectional view taken generally along line 19—19 in FIG. 18 and illustrating the cross section of the modified V groove.

While the V grooves such as the grooves 52 and 53 described above can terminate in a rather sharp apex if desired, nevertheless it is believed preferable to provide the groove with a narrow flat surface at the apex. In this regard, attention is directed to FIGS. 18–19 which illustrate a preferred cross section of the V groove. The apex of the V groove, as illustrated in FIG. 19, rather than being sharp is instead provided with a narrow but generally flat wall or surface 71 which can be generally parallel with but spaced a small distance from the front surface of the blank so as to define the narrow bridge 55 therebetween. This configuration of the V groove is believed easier to manufacture due to the ease of maintaining the shape and sharpness of the tool used for forming the V groove. In addition, this configuration additionally provides a small clearance or gap between the opposed tapered end surfaces 62–63 when the adjacent vertical and horizontal flanges are folded into their frame-defining position, which small clearance or gap facilitates the passage of excess corner fabric therebetween when the corner fabric is tucked and clamped between the frame corner in the manner illustrated by FIG. 10.

While the improved cover pad 21 of this invention and the manufacturing process therefor is particularly desirable for cover pads employing a thin flexible covering sheet formed of fabric or cloth, it will be appreciated that other thin sheetlike covering materials having at least limited flexibility or bendability can also be utilized to define cover pads in accordance with the present invention. For example, other sheet materials which may be useable for defining cover pads according to the present invention include thin metal foils or thin high pressure laminates which can be bent to define corners, particularly when heated, although such laminates may be useable only when a more gradual or rounded corner is provided, such as the beveled corner illustrated in FIGS. 14–15.

With the cover pad of this invention, the resulting pad possesses substantial strength and rigidity, and at the same time the material defining the substrate or blank can have at least some sound-absorbing properties so as to at least partially minimize either reflection or transmission of environmental noise, and at the same time permit for more efficient and time-saving attachment of the fabric to the substrate while additionally resulting in a fabric-covered pad having improved uniformity of appearance and particularly improved formed fabric corners. The material defining the substrate of the pad, namely the material defining the blank 51, is also economical and hence further facilitates the efficient and economical manufacture of the cover pad.

While the invention as discussed above relates to a blank which is formed, as by being cut, from a larger sheet of material, it will be appreciated that the blank can be directly formed as a flat sheetlike member wherein the grooves and the recessed corners are formed during formation of the blank. For example, the blank may be die cut from a larger sheet of material so as to create the corner recesses during forming of the blank, prior to grooving thereof. With respect to the grooves, in some situations they may be molded or pressed into the flat blank, particularly when the flat blank is initially formed so as to have the desired configuration suitable to permit folding of the edges.

In addition, the substrate defining the blank may include therein binding fibers that act like an adhesive for adhering fabric to the face of the blank, thereby eliminating the need for a secondary operation of applying a separate adhesive to the board prior to securement of the fabric or covering.

While the invention as described above principally shows the fabric being wrapped around the edge of the blank and terminating at an outer edge thereof, similar to that illustrated in FIG. 10, it will be appreciated that the fabric can be totally wrapped around the foldable edge parts so that the edge portion of the fabric is trapped inside the groove when the edge parts are folded into the assembled position.

It is further contemplated that small electrical wires can be disposed within the grooves, such as in undercuts therein, whereby the wires will be trapped in and extend lengthwise along the grooves when the edge parts are in the assembled folded position, thereby enabling electrical wires to be more readily associated with the wall panel so as to extend lengthwise along the cover pads, with the wires of longitudinally adjacent cover pads being electrically adjoined on the inner sides of the cover pads by a suitable electrical jumper which can be provided with suitable releasable connectors for engagement with similar connectors formed inside the cover pads. If necessary or desirable, a part of the folded edge of the cover pad, such as the upright folded edges, can be partially removed to permit passage of electrical wires between and behind adjacent covers.

While it is believed that physically securing the folded edge strips to the main center part of the blank is a preferred construction for a pad or wall member according to the present invention, nevertheless it will be appreciated that in some instances it may be desirable to form the pad or wall covering in the same manner, but not effect permanent securement of the edge parts in a folded position. For example, if used with an appropriate frame, the folded edge parts in the folded position can be disposed for fixed securement with the frame so as to hold the cover pad thereto, without effecting adhesive securement of the edge parts in the folded position.

While it is contemplated that in most situations the grooves formed in the blank material will not penetrate entirely through the thickness of the blank, nevertheless in some situations the latter may be desirable. If the groove is permitted to penetrate entirely through the thickness of the blank, however, then in such situation the fabric will typically be adhered to the exterior side of the blank prior to forming of the entire groove therein, such that, when the groove is formed through the thickness of the blank, the fabric functions as a living hinge for positionally holding the center and edge frame parts together.

While the invention as described above has referenced the forming of a cover or wall pad, such as for use in defining an exterior surface of an upright wall, such as a portable wall panel, it will be appreciated that the formed pad or product of the present invention can also be formed for other uses, including uses wherein the resulting wall pad may be oriented in a disposition other than vertical.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A process for forming a cover pad adapted for attachment to an upright wall, comprising the steps of:
   providing a one-piece, relatively rigid, flat blank having a length and width which are large relative to a thickness thereof, the flat blank defining thereon generally parallel front and rear surfaces bounded by lengthwise and widthwise extending edges, the blank being bordered by edge surfaces which extend transversely between the edges associated with the front and rear surfaces;
   forming a plurality of grooves in said one-piece flat blank from the rear surface thereof with a respective one of said grooves being disposed sidewardly adjacent and extending along each of said edges throughout the respective length thereof, said grooves projecting into the thickness of the blank to a depth which is less than the thickness of the blank so that the bottom of each said groove is separated from the front surface of the blank by a narrow bridge section, said grooves dividing the one-piece flat blank into a main pad part which is bounded on all sides by said grooves and edge flange parts which are defined transversely between and extend along the grooves and the respective edges and corner parts which are defined outwardly of the grooves where they intersect;
   providing a sheet of thin flexible covering material sized to fully cover the front surface of said on-piece flat blank, the covering material comprising a thin flexible sheet of cloth, fabric or foil;
   after forming of the grooves in the blank, then positioning the sheet of covering material to overlie the front surface of the one-piece flat blank;
   securing the sheet of covering material to the one-piece flat blank so that the covering material flatly overlies the front surface of the flat blank;
   after forming of the grooves, removing the corner parts from the blank so as to define generally rectangular recesses at the corners of the blank;
   then folding the edge flange parts transversely relative to the main pad part about the respective bridge sections into a frame-defining position wherein the edge flange parts surround and protrude transversely rearwardly relative to the front surface of said main pad part, the bridging section fracturing or functioning as a hinge when the respective edge flange part is folded transversely into said frame-defining position, and the covering material where it extends over the bridge sections functioning as a hinge as the edge flange parts are folded into the frame-defining position;
   displacing each corner region of the sheet of flexible covering material, where the covering material extends across the recess at the corner of the blank, rearwardly and inwardly relative to the front surface of the main pad part so that the corner region is clampingly held between opposed end surfaces of adjacent said edge flange parts when the latter are in said frame-defining position; and
   fixedly securing said edge flange parts, when in said frame-defining position, to said main pad part to define a relatively rigid ring-shaped frame which is fixed to and surrounds said main pad part.

2. A process according to claim 1, wherein the grooves formed in said one-piece flat blank define therein an included angle of about 90° between opposed converging side walls thereof.

3. A process according to claim 1, wherein the grooves have a generally V-shaped or U-shaped cross section.

4. A process according to claim 1, including providing an adhesive in the grooves prior to folding of the edge flange parts, and then adhesively fixedly securing the edge flange parts to the main pad part when the edge flange parts are folded into said frame-defining position.

5. A process according to claim 1, including forming a plurality of second grooves in said one-piece flat blank from the rear surface thereof with a said second groove being disposed sidewardly adjacent and extending along and parallel with each of said first-mentioned grooves so that said second groove is disposed sidewardly between said first-mentioned groove and the respective edge, said second groove being configured similar to said first groove and having a depth such that a bottom of said second groove is separated from the front surface of the one-piece flat blank by a second narrow bridge section, whereby said second groove divides the respective edge frame part into an outer edge frame portion which extends transversely between said edge and said second groove and an inner edge frame portion which extends transversely between said second and first-mentioned grooves.

6. A process according to claim 5, including providing each of said first-mentioned and second grooves with an included angle of about 45°, folding said inner edge frame portion inwardly and rearwardly relative to said main pad part about said first-mentioned groove so that said inner edge frame portion projects rearwardly at an angle of about 45° with respect to the main pad part, and folding the outer edge flange portion inwardly and rearwardly with respect to the inner edge flange portion about said second groove so that said outer edge flange portion projects rearwardly with respect to the main pad part.

7. A process according to claim 1, wherein the securing of the sheet of covering material to the one-piece flat blank involves adhesively securing the sheet of covering material to those areas of the front surface which are defined by said edge flange parts.

8. A process according to claim 1, including:
providing the sheet of covering material with a size which is greater than the width and length dimensions of the front surface of the one-piece flat blank so that the sheet of covering material includes peripheral edge portions which project outwardly beyond the respectively adjacent edges of the front surface;
folding the peripheral edge portions of the sheet transversely to overlie the peripheral edge surfaces of the one-piece flat blank; and
fixedly securing the peripheral edge portions of the sheet directly to the respective edge surfaces of the blank prior to folding of the edge flange parts into said frame-defining position.

9. A process according to claim 1, wherein the securing of the covering sheet to the one-piece flat blank includes adhesively securing the covering sheet to substantially the entire front surface of the one-piece flat blank prior to the folding of the edge flange parts into the frame-defining position.

10. A process according to claim 1, wherein each said groove is provided with a generally V-shaped cross section having a depth which is only slightly less than the thickness of the blank thickness so that the bridging section which separates the bottom of the respective groove from the front surface of the blank has a thickness which is no greater than about ten percent of the blank thickness.

11. A process according to claim 1, wherein the blank is selected from one of the following materials: wood including particle board and wood fiberboard, mineral board, and R board.

12. A process according to claim 1, including providing a plurality of mounting elements each having a frame-engaging portion adapted to project rearwardly from the cover pad for attachment to a frame of a wall, each said mounting element also having a platelike mounting portion adapted for securement to the cover pad, and securing the mounting portion of each said mounting element between the opposed side walls of the groove when the edge flange part is fixed in said frame-defining position so that the respective frame-engaging portion projects rearwardly of the frame.

13. A process according to claim 1, including forming the grooves of a generally V-shaped cross section with the apex of the groove defined by a narrow but generally flat surface which defines one side of the bridge section and which extends throughout the length of the groove.

14. A process for forming a cover pad adapted for attachment to an upright wall, comprising the steps of:
providing a on-piece, relatively rigid, flat blank having a length and width which are large relative to a thickness thereof, the flat blank defining thereon generally parallel front and rear surfaces bounded by lengthwise and widthwise extending edges, the blank being bordered by edge surfaces which extend transversely between the edges associated with the front and rear surfaces;
forming a plurality of grooves in said one-piece flat blank from the rear surface thereof with a respective one of said grooves being disposed sidewardly adjacent and extending along each of said edges throughout the respective length thereof, said grooves projecting into the thickness of the blank to a depth which is less than the thickness of the blank so that the bottoms of the grooves are separated from the front surface of the blank by a narrow bridge section, said grooves dividing the one-piece flat blank into a main pad part which is bounded on all sides by said grooves and edge flange parts which are defined transversely between and extend along the grooves and the respective edges;
providing a sheet of thin flexible covering material sized to fully cover the front surface of said on-piece flat blank;
positioning the sheet of covering material to overlie the front surface of the one-piece flat blank;
securing the sheet of covering material to the on-piece flat blank so that the covering material flatly overlies the front surface of the flat blank;
folding the edge flange parts transversely relative to the main pad part about the respective bridge sections into a frame-defining position wherein the edge flange parts surround and protrude transversely rearwardly relative to the front surface of said main pad part, the bridge sections fracturing when the edge flange parts are folded into the frame-defining position, and the covering sheet where it extends over the bridge sections functioning as a hinge as the edge flange parts are folded into the frame-defining position;
displacing each corner region of the sheet of flexible covering material rearwardly and inwardly relative to the front surface of the main pad part so that the corner region is clampingly held between opposed end surfaces of adjacent said edge flange parts when the latter are in said frame-defining position; and fixedly securing said edge flange parts, when in said frame-defining position, to said main pad part to define a relatively rigid ring-shaped frame which is fixed to and surrounds said main pad part.

15. A process according to claim 14, including providing a mounting element having a frame-engaging portion adapted to project rearwardly from the cover pad for attachment to a frame of a wall, said mounting element having a mounting portion adapted for securement to the cover pad, and securing the mounting portion of the mounting element between the opposed side walls of the groove when the edge flange part is fixed in said frame-defining position.

16. A process according to claim 14, including:

providing the sheet of covering material with a size which is greater than the width and length dimensions of the front surface of the one-piece flat blank so that the sheet of covering material includes peripheral edge portions which project outwardly beyond the respectively adjacent edges of the front surface;

folding the peripheral edge portions of the sheet transversely to overlie the peripheral edge surfaces of the one-piece flat blank; and fixedly securing the peripheral edge portions of the sheet directly to the respective edge surfaces of the blank.

17. A process according to claim 14, wherein the blank initially has a rectangular configuration prior to forming of the grooves therein and, after forming of the grooves, removing corner regions of the blank as defined outwardly of the grooves where they intersect so as to define generally rectangular recesses at the corners of the blank.

18. A process according to claim 14, including providing an adhesive in the grooves prior to folding of the edge flange parts, and then adhesively fixedly securing the edge flange parts to the main pad part when the edge flange parts are folded into said frame-defining position.

* * * * *